United States Patent
Paek et al.

(10) Patent No.: US 8,711,185 B2
(45) Date of Patent: Apr. 29, 2014

(54) APPARATUS AND METHOD FOR SCROLLING A SCREEN OF A PORTABLE TERMINAL HAVING A TOUCH SCREEN

(75) Inventors: Chi Hyeon Paek, Gyeongsangbuk-do (KR); Jeong Wook Seo, Daegu (KR); Dae Beom Park, Gyeongsangbuk-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 665 days.

(21) Appl. No.: 12/817,474

(22) Filed: Jun. 17, 2010

(65) Prior Publication Data

US 2010/0321411 A1    Dec. 23, 2010

(30) Foreign Application Priority Data

Jun. 18, 2009    (KR) .................. 10-2009-0054373

(51) Int. Cl.
  *G09G 5/00*    (2006.01)
  *G06F 3/041*   (2006.01)
(52) U.S. Cl.
  USPC .......................................... 345/684; 345/173
(58) Field of Classification Search
  USPC ...................................................... 345/684
  See application file for complete search history.

(56) References Cited

U.S. PATENT DOCUMENTS

| | | | |
|---|---|---|---|
| 6,339,437 B1 * | 1/2002 | Nielsen .................. | 715/787 |
| 6,690,387 B2 * | 2/2004 | Zimmerman et al. ........ | 345/684 |
| 2004/0140984 A1 * | 7/2004 | Hinckley et al. ............. | 345/684 |
| 2007/0150830 A1 * | 6/2007 | Ording et al. ................. | 715/784 |
| 2008/0168384 A1 * | 7/2008 | Platzer et al. ................. | 715/784 |
| 2008/0174570 A1 * | 7/2008 | Jobs et al. ..................... | 345/173 |
| 2008/0231610 A1 * | 9/2008 | Hotelling et al. ............. | 345/173 |
| 2010/0146387 A1 * | 6/2010 | Hoover ........................ | 715/702 |
| 2010/0231534 A1 | 9/2010 | Chaudhri et al. | |
| 2010/0231535 A1 | 9/2010 | Chaudhri et al. | |
| 2010/0231536 A1 | 9/2010 | Chaudhri et al. | |
| 2010/0231537 A1 | 9/2010 | Pisula et al. | |

* cited by examiner

*Primary Examiner* — David Zarka
*Assistant Examiner* — Vu Nguyen
(74) *Attorney, Agent, or Firm* — Cha & Reiter, LLC (57) ABSTRACT

Methods of scrolling a screen of a portable terminal having a touch screen. One exemplary method includes outputting a scrollable image; checking an entire scrolling amount of the image; measuring a drag-related variation when a drag is generated; calculating a scrolling rate based on the measured drag-related event with respect to a preset value; and outputting an image at a position corresponding to the scrolling rate based on the entire scrolling amount when the drag is cancelled.

23 Claims, 10 Drawing Sheets

APPARATUS AND METHOD FOR SCROLLING A SCREEN OF A PORTABLE TERMINAL HAVING A TOUCH SCREEN

CLAIM OF PRIORITY

This application claims, pursuant to 35 USC 119(a), priority to, and the benefit of the earlier filing date of, that patent application entitled, "Apparatus and Method for Scrolling Screen of Portable Terminal Having Touch Screen" filed in the Korean Patent Office on Jun. 18, 2009 and afforded serial number 10-2009-0054373, the contents of which are incorporated by reference, herein.

BACKGROUND OF THE INVENTION

1. Field of the Invention

The present invention relates to the field of wireless communication terminals and, more particularly, to a method and apparatus for adjusting a scrolling rate of a screen of a portable terminal having a touch screen.

2. Description of the Related Art

A touch screen is an input device and display device that performs both an input function and an output function. An electronic device using touch screen does not need a separate input device, thereby reducing the size of the electronic device and increasing the size of the display unit. In addition, the touch screen can perform an input function by being contacted by an inputting tool, such as a finger and a stylus pen, so that an intuitive operation is possible. Hence, more and more electronic devices are suing a touch screen as their primary mode on inputting. Particularly, more and more portable terminals use a touch screen.

Further, one method of scrolling a screen of a portable terminal using a touch screen is moving a scroll bar displayed at one side of a screen. At this time, in order to move the scroll bar, a user touches the scroll bar and moves the scroll bar. However, operations using a scroll bar are inconvenient in a portable terminal because of the limited size of the screen. Particularly, a user may feel more inconvenienced when the size of the scroll bar gets smaller because the scrolling amount is large.

Another method of scrolling a screen of a portable terminal using a touch screen is using a drag operation. However, the method of scrolling using a drag operation has the same scrolling rate as that of the movement of the drag operation. That is, the scrolling has been performed by screen units. Hence, the method of scrolling a screen of a portable terminal using a drag causes inconvenience in that multiple drag operations must be performed when the scrolling amount is large.

SUMMARY OF THE INVENTION

The present invention provides a method and apparatus for scrolling a screen of a portable terminal having a touch screen, in which a user can adjust the scrolling rate.

In accordance with an aspect of the present invention, a method of scrolling a screen of a portable terminal having a touch screen includes: outputting a scrollable image; checking an entire scrolling amount of the image; measuring a drag-related variation when a drag operation is generated; comparing the drag-related variation with a preset reference value, and calculating a scrolling rate based on the drag-related variations and outputting an image of a position corresponding to the scrolling rate from the drag-related variation based on the entire scrolling amount when the drag operation is cancelled.

In accordance with another aspect of the present invention, an apparatus for scrolling a screen of a portable terminal includes: a touch screen that outputs a scrollable image and recognizes operations of a touch, a drag and a drag cancellation; and a controller which controls operations to check an entire scrolling amount of the image when the image is outputted, measure a drag-related variation when a drag operation is generated, calculate a scrolling rate based on the measured drag-related variation with respect to a preset reference value and output an image at a position corresponding to the scrolling rate based on the entire scrolling amount of the image when the drag operation is cancelled.

As described above, a method and apparatus for scrolling a screen of a portable terminal having a touch screen according to the present invention provides for a scrolling rate that can be appropriately adjusted to move to a screen at a desired position, so that user's convenience can be improved. In addition, according to the present invention, a user can accurately recognize the current scrolling rate as the scrolling rate is visually outputted at one side of the display unit using a color, a number, a graph or the like.

BRIEF DESCRIPTION OF THE DRAWINGS

The above and other aspects, features, and advantages of certain exemplary embodiments of the present invention will be more apparent from the following description taken in conjunction with the accompanying drawings, in which.

DETAILED DESCRIPTION OF THE INVENTION

Exemplary embodiments of the present invention are described in detail with reference to the accompanying drawings. The same reference numbers are used throughout the drawings to refer to the same or like parts. Detailed descriptions of well-known functions and structures incorporated herein may be omitted to avoid obscuring the subject matter of the present invention.

A portable terminal according to an exemplary embodiment of the present invention is a terminal having a touch screen, and can be representative of all information communication devices and multimedia devices, such as a Navigation terminal, a digital broadcast terminal, Personal Digital Assistant (PDA), Smart Phone, an International Mobile Telecommunication 2000 (IMT-2000) terminal, a Code Division Multiple Access (CDMA) terminal, a Wideband Code Division Multiple Access (WCDMA) terminal, a Global System for Mobile communication (GSM) terminal, a Universal Mobile Telecommunication Service (UMTS) terminal, Note-Book PC, Ultra Mobile Personnel Computer (UMPC), and Portable Multimedia Player (PMP).

Hereinafter, the expression "touch" refers to a state where a user's finger or a stylus pen contacts a touch screen. The expression "touch cancellation" refers to canceling a finger or a stylus pen's contacting a touch screen. The expression "drag" refers to an operation that moves a touch point in the state where a touch is maintained on the touch screen. In addition, "drag cancellation" refers to an operation of removing a finger or a stylus pen's from contacting the touch screen after dragging.

Thus, when a user performs a drag on a screen where a scrolling-possible image is outputted, the drag-related variations (the drag length and time until the drag is cancelled after the dragging is stopped) are measured, the drag-related variations and preset reference values are compared to generate a scrolling rate, and the image at the position corresponding to the scrolling rate generated based on the entire scrolling rate of the image when the drag is cancelled is outputted. Hereinafter, such a screen scrolling method is called an elastic scrolling.

Figure 1:
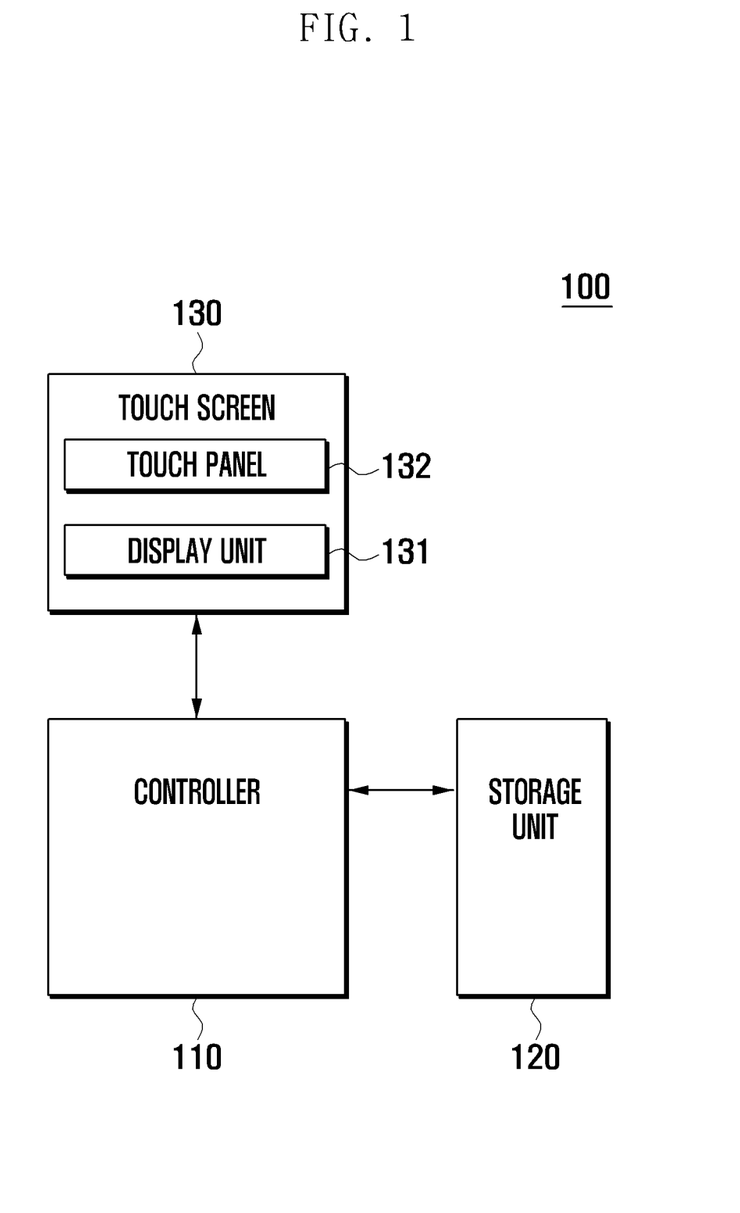
FIG. 1 is a block diagram schematically illustrating a configuration of a portable terminal according to an exemplary embodiment of the present invention.
Figure 2:
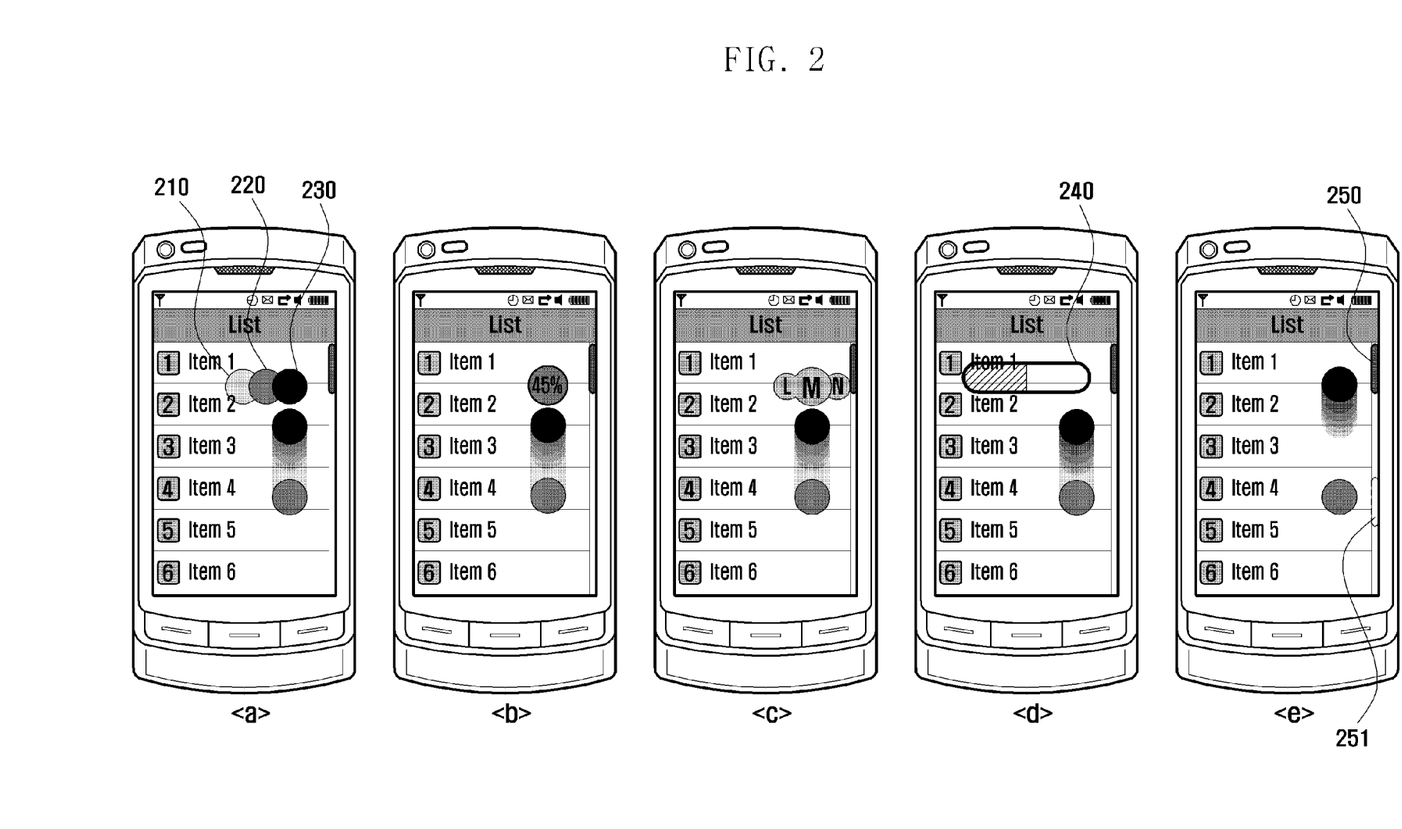
FIG. 2 illustrates representative views of methods of outputting various scrolling rates according to an exemplary embodiment of the present invention.
Figure 3:
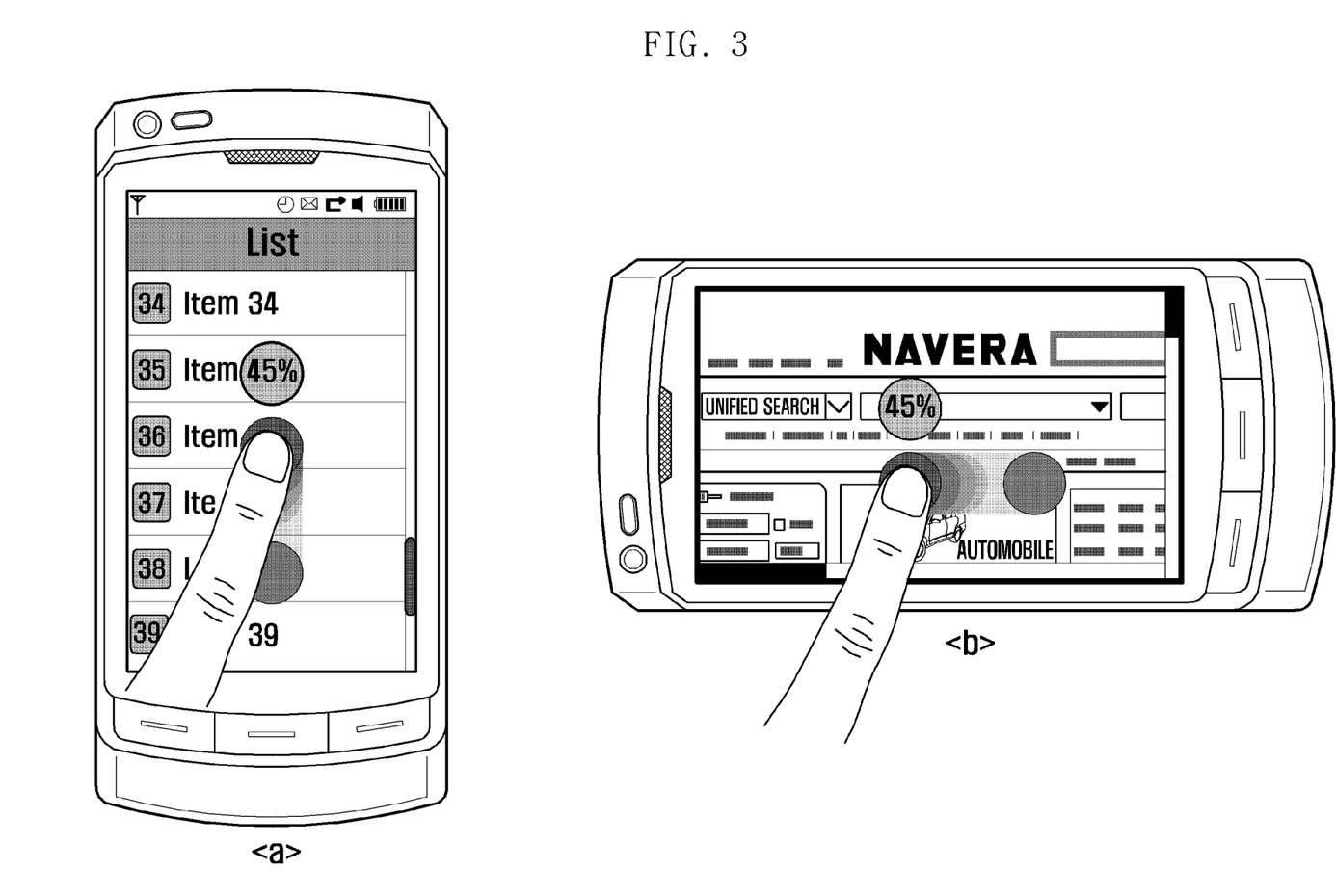
FIG. 3 illustrates an outputting position of a scrolling rate according to the direction of a portable terminal according to an exemplary embodiment of the present invention.
Figure 4:
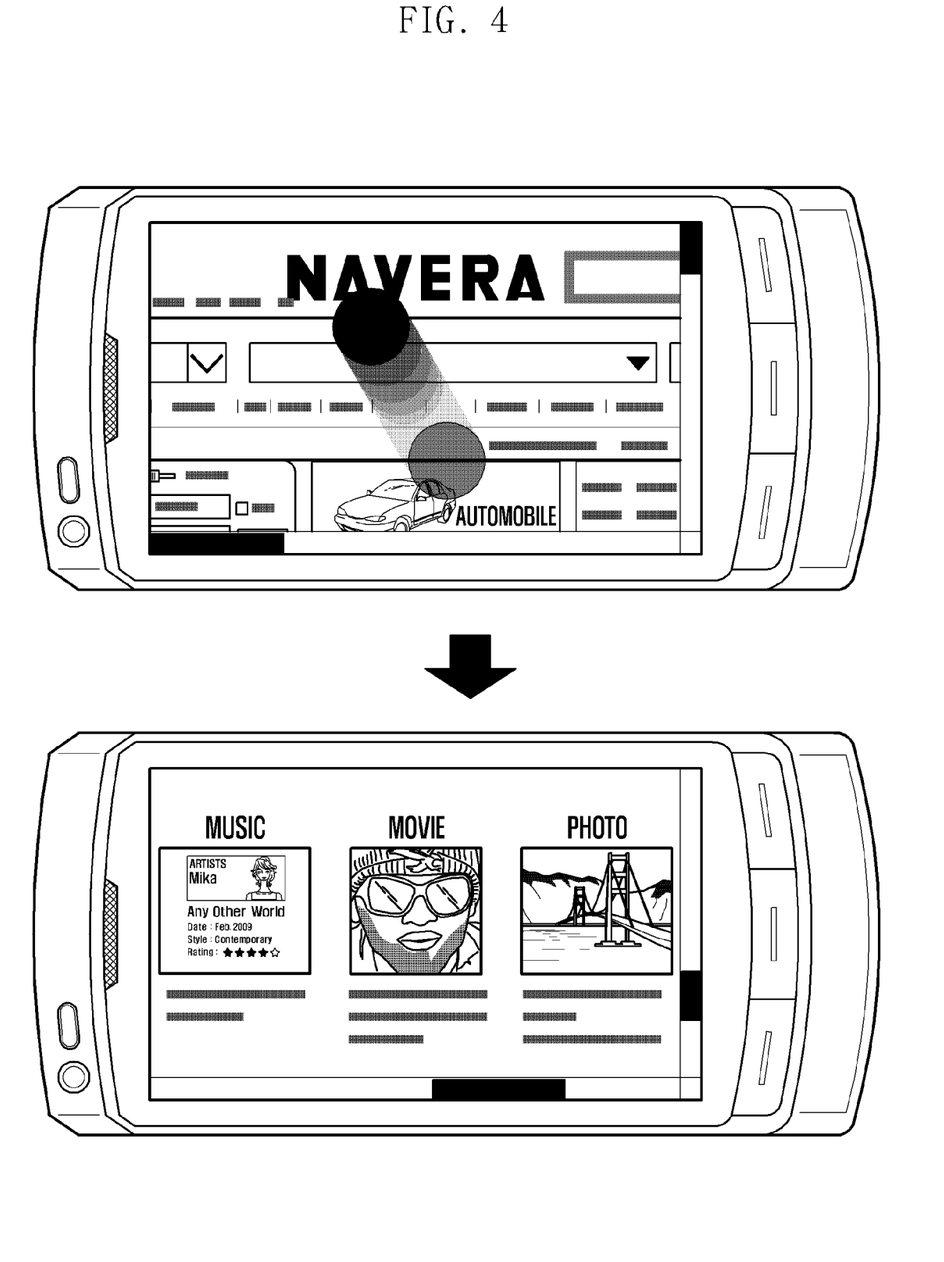
FIG. 4 illustrates scrolling in a diagonal direction according to an exemplary embodiment of the present invention.

FIG. 1 is a block diagram schematically illustrating a configuration of a portable terminal 100 according to an exemplary embodiment of the present invention, FIG. 2 illustrates a method of outputting various scrolling rates according to an exemplary embodiment of the present invention, FIG. 3 illustrates outputting a position of a scrolling rate according to the direction of a portable terminal according to an exemplary embodiment of the present invention, and FIG. 4 illustrates scrolling in a diagonal direction according to an exemplary embodiment of the present invention.

Referring to FIGS. 1 to 4, the portable terminal 100 according to an exemplary embodiment of the present invention includes a touch screen 130, a storage unit 120 and a controller 110.

The storage unit 120 can store a program which is necessary for performing generation operations and a specific function of a portable terminal 100, and data that is generated during execution of the program. For example, the storage unit 120 can store an operating system (OS) which boots the portable terminal 100, an application program which is necessary for operating a function of the portable terminal 100, and data which is generated as the portable terminal 100 is used. Such a storage unit 120 can comprise a ROM (read only memory) and a RAM (random access memory) or the like (not shown). Particularly, the storage unit 120 according to the present invention can include programs that are capable of generating a scrolling rate according to at least one of a drag length when a drag operation is inputted, and time until the drag is canceled after the drag is stopped, and can store a program which visually outputs the generated scrolling rate and execution data for executing the program. To this end, the storage unit 120 can store at least one of a drag length (hereinafter, the reference drag length) by which the scrolling rate becomes 100%, and a time until drag cancellation after the drag is stopped (hereinafter, the reference time) by which the scrolling rate becomes 100%. For example, in case the reference drag length is set to be 5 centimeters (cm), when user drags by 1 cm, the scrolling rate is determined to be 20%, and if user drags by 2 cm, the scrolling rate becomes 40%. Likewise, if the time is set 5 seconds, if one second passes after the drag is stopped, the scrolling rate becomes 20%, and if two seconds pass, the scrolling rate becomes 40%.

The touch screen 130 can include a display unit 131 and a touch panel 132. The display unit 131 can output screen data which is generated during performance of a function of the portable terminal 100, and state information according to a user's key operations and function setting or the like. In addition, the display unit 131 can visually display various signals and color information which are outputted from the controller 110. Such a display unit 131 may be formed as a liquid crystal display (LCD) and an organic light-emitting diode (OLED) or the like. Particularly, the display unit 131 according to an exemplary embodiment of the present invention can output an image at a position corresponding to the scrolling rate generated according to the drag-related variation (a drag length, a time until drag cancellation after the drag is stopped) when a drag is performed in a state where a scrollable image is outputted under the control of the controller 110. In addition, the display unit 131 can visually (e.g., a number, a color, a character and a graph or the like) output the scrolling rate under the control of the controller 110. The detailed description will be explained later.

The touch panel 132 can perform an input unit function which receives an input from the user. The touch panel 132 is mounted over the display unit 131, senses the touch by detecting the change of the physical quantity generated due to the user's surface touch of the touch panel 132, and converts the physical quality change according to the touch into a touch signal. The touch signal is transmitted to the controller 110. Such a touch panel 132 may use a weight distribution method using a pressure sensor, a metal wire mount method (decompression method), a resistive method, an electrostatic capacity method, a supersonic reflection method, an optical sensor and electronic inducement method or the like. The operation principle of each of the above-mentioned touch panels 132 is well-known to those skilled in the art, so that a detailed description of the operation of the touch screen need not be provided herein.

The controller 110 performs a general control operation for a portable terminal 100, and controls a signal flow between blocks within the portable terminal 100. The controller 110 can control the touch screen 130 to display information, receive an input of a touch signal, and perform a function corresponding to the touch signal. For example, in case a user touches a specific music file from the music file list, the controller 110 can control the playing of the touched music file. The controller 110 can recognize touch coordinates by analyzing the touch signal generated when touched, and can recognize a coordinate movement as a drag operation before touch cancellation has been detected. Particularly, the controller 110, according to an exemplary embodiment of the present invention, can check the drag length when a drag is generated in a scrollable image, and generate a scrolling rate according to the drag length. That is, the controller 110 can determine the drag length using the initial coordinates where a touch was generated and the current coordinates, and generate the scrolling rate by calculating a ratio of the generated drag length to the reference drag length stored in the storage unit 120. For example, if the reference drag length is 5 cm and the current drag length is 2 cm, the scrolling rate becomes 40%. Thereafter, the controller 110 can control the scrolling of an image by the generated scrolling rate an output the image at a position corresponding to the scrolling rate when the drag is canceled. To this end, the controller 110 can check the entire scrolling amount of the image, scroll the image by the scrolling rate and output the image at the position corresponding to the scrolling rate based on the fact that the entire scrolling amount is 100%. Alternatively, the controller 110 can check the scrolling direction, match the remaining scrolling amount in the scrolling direction to 100% and scroll the image by the scrolling rate.

Alternatively, the controller 110 can count time until drag cancellation after the drag is stopped and can calculate the scrolling rate according to the counted time. That is, the controller 110 can calculate the scrolling rate by calculating the ratio of the reference time stored in the store unit 120 to the currently counted time. For example, if the reference time is 5 seconds, and the currently counted time is 1 second, the scrolling rate becomes 20%. Thereafter, the controller 110 can output the image at the position corresponding to the scrolling rate calculated according to the time when the drag is cancelled. At this time, the controller 110 can scroll the image by the scrolling rate, output the image at the position corresponding to the scrolling rate based on the above-described entire scrolling amount of the image. Alternatively, the controller 110 can check the scrolling direction, and scroll the image by the scrolling rate based on the remaining scrolling amount in the scrolling direction.

The controller 110 can output the calculated scrolling rate at one side of the display unit 131. The scrolling rate can be outputted as a number (e.g., a percentage rate), a color change, a first character, a graph or the like, at one side of the display unit 131 so that the scrolling rate is not hidden by a finger. For example, the controller 110 can distinguish the scrolling rates calculated according to the drag length or time and output the scrolling rate in the display unit 131 as illustrated in view (a) of FIG. 2. To this end, it is desirable that the storage unit 120 matches the scrolling rate to a specific color and stores the match. That is, the controller 110 can output a first color 210 when the scrolling rate is larger than 0% and equal to or less than 30%, a second color 220 when the scrolling rate is larger than 30% and equal to or less than 70%, and a third color 230 when the scrolling rate is larger than 70% and equal to or less than 100% on the display unit. Although color is discussed for purposes of illustration different degrees of darkness are shown.

At this time, the controller 110 can divide the scrolling rate further by making the brightness of each color different. For example, the controller 110 can make the brightness of the second color 220 lower as the scrolling rate gets close to 30%, and make the brightness of the second color 220 higher as the scrolling rate gets close to 70%. Further, with regard to view (a) of FIG. 2 the first color 210, the second color 220 and the third color 230 are illustrated as being outputted at different position. However, this display orientation is only for explanatory convenience, and the positions where the first color 210, the second color 220 and the third color 230 are outputted are the same.

As would be recognized, the direction of the drag operation may be initially in either an upward or downward direction on the touch screen. For example, as illustrated in FIG. 2, the scroll direction is represented as being in a downward direction as indicated by transitioning from a dark form to a lighter form.

In another aspect of the invention, the controller 110 can output the scrolling rate calculated according to the drag length or time as a percentage rate as illustrated in view (b) of FIG. 2. Alternatively, the controller 110 can output the calculated scrolling rate as a character (L, M, H) as illustrated in view (c) of FIG. 2. For example, the controller 110 can check the list of positions corresponding to the calculated scrolling rates, and output the first character of the checked list. At this time, the controller 110 can output the first character of a previous screen list and the first character of a next screen list as a relatively smaller size than the first character. Such a scrolling rate output method will be useful in case the list is arranged in an alphabetic order. Alternatively, a desired screen can be more easily outputted because a user can check the first character.

Alternatively, the controller 110 can control the display unit 131 to output the calculated scrolling rate in a graph form. For example, the controller 110 can output a bar 240 of a specific size and can fill the inside of the bar 240 with a specific color as illustrated in view (d) of FIG. 2 to represent the scrolling rate. In other words, the controller 110 can fill the entire bar 240 with a characteristic color when the scrolling rate is 100%, and fill half the bar 240 with a specific color when the scrolling rate is 50%.

In addition, the controller 110 can output a virtual scrolling bar 251 at a position corresponding to the scrolling rate, without separately outputting the scrolling rate, at one side of the display unit 131 as illustrated in view (e) of FIG. 2. It is desirable for the virtual scrolling bar 251 to be distinguished from the scrolling bar 250 that indicates the current position through a dotted line, transparency adjustment, color change or the like. At this time, the display unit 131 can maintain a screen corresponding to the current position.

In addition, the controller 110 can change the outputting position of the scrolling rate according to a vertical mode (a state where the screen is outputted vertically long) (i.e., view (a)) or a horizontal mode (a state where the screen is outputted horizontally long) (i.e., view (b)) of the portable terminal 100 as illustrated in FIG. 3 in order to prevent the scrolling rate from being hidden by the illustrated finger. The controller 110 can recognize the vertical mode from the horizontal mode of the portable terminal 100 through the screen output state. Alternatively, the controller 110 can recognize the vertical mode and the horizontal mode of the portable terminal 100 by a sensor value in case the portable terminal 100 includes such a sensor (e.g., a gravity sensor) for distinguishing the horizontal mode from the vertical mode.

Further, as illustrated in FIG. 4, in case an image (e.g., a web page), which can be scrollable in both horizontal and vertical directions, is outputted, a user can scroll the image in both horizontal and vertical directions by dragging in a diagonal direction. At this time, the controller 110 can calculate the drag length in the horizontal direction and the vertical direction, respectively, or can calculate the drag length in a diagonal direction. Thereafter, the controller 110 can output the calculated scrolling rates in the horizontal direction and the vertical direction, or can output the calculated scrolling rate in the diagonal direction. The controller can output a dotted line, an arrow or the like, which indicates the direction information between the initial coordinates and the current coordinates in order to indicate the drag direction.

In addition, in case the existing scrolling method and the elastic scrolling method according to the present invention are mixed and used, the controller 110 can check whether the drag is cancelled within a preset time after the drag is started, and perform a scrolling operation if the drag is cancelled within the preset time and activate an elastic scroll according to the present invention if the drag is not cancelled within the preset time. Details regarding this dual mode operation will be described later with reference to FIG. 9.

In addition, though not illustrated, the portable terminal 100 can selectively include components having additional functions, such as a camera module for capturing an image or a video, a local communication module for a local wireless communication, a broadcast reception module for receiving a broadcast, a digital music source play module, such as an MP3 module and an Internet communication module for performing an Internet function by communicating with the Internet network or the like. Such components can be variously modified according to the convergence trend of digital devices, so that it is impossible to list all such components, but the portable terminal according to the present invention may further include other components similar to the above-mentioned components.

Hereinafter, outputting the scrolling rate as a percentage rate will be described.

Figure 5:
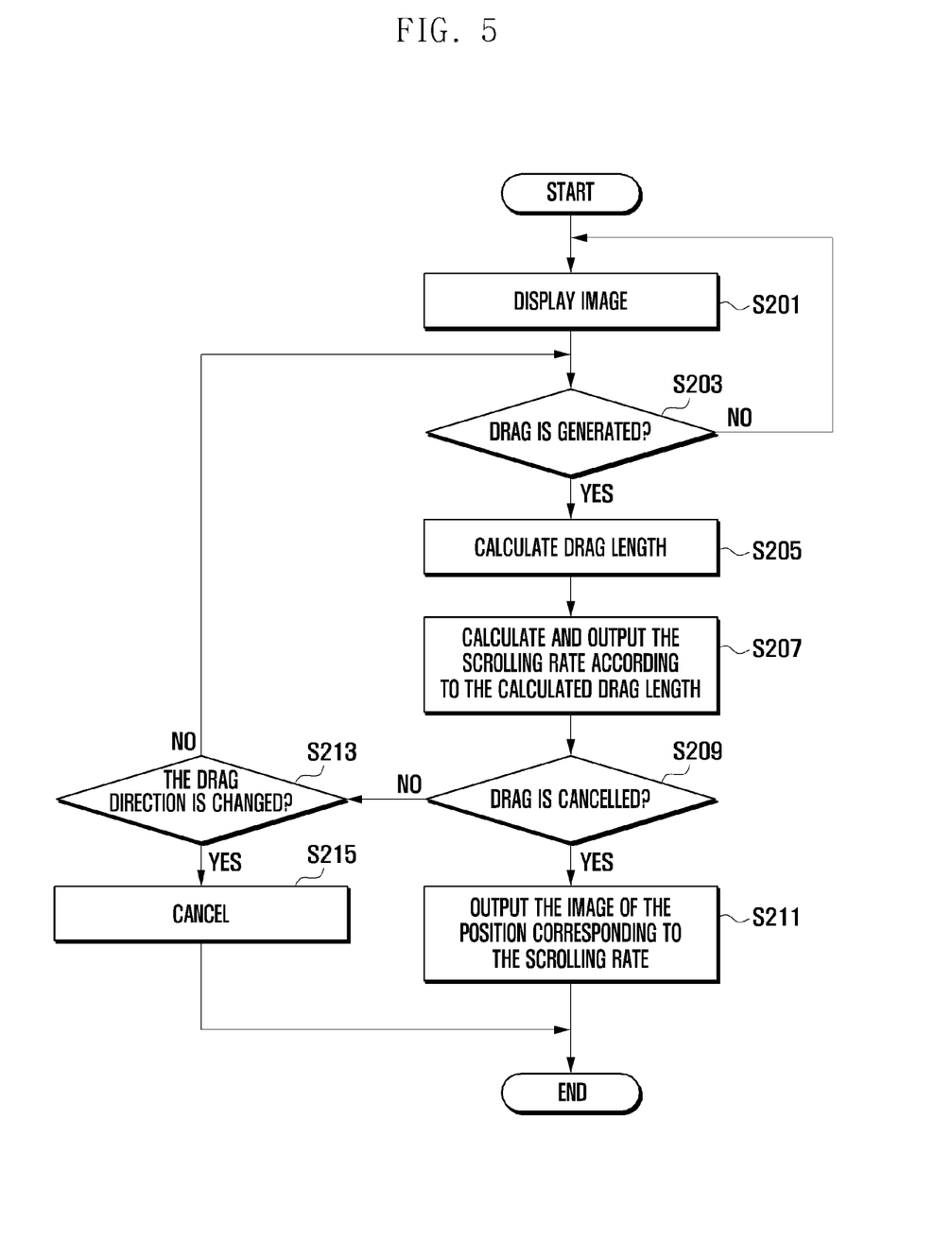
FIG. 5 is a flowchart illustrating a method of scrolling a screen of a portable terminal according to a first exemplary embodiment of the present invention.
Figure 6:
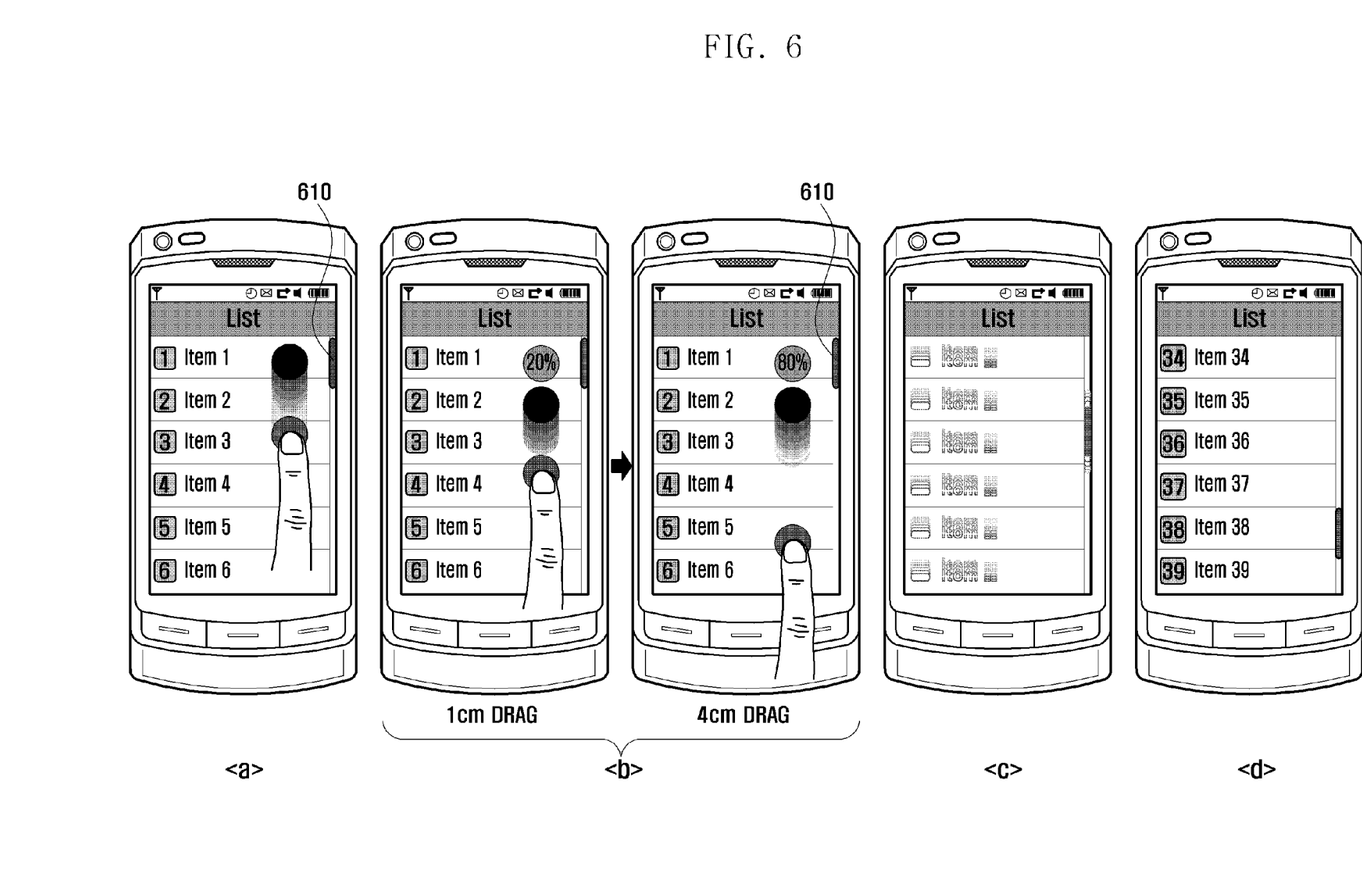
FIG. 6 illustrates representative examples of screen views explaining a first exemplary embodiment of the present invention.

FIG. 5 is a flowchart illustrating a method of scrolling a screen of a portable terminal according to a first exemplary embodiment of the present invention, and FIG. 6 illustrate exemplary screen views for explaining the first exemplary embodiment of the present invention.

Referring to FIGS. 1, 5 and 6, the controller 110 displays a scrollable image (S201). For example, the controller 110 can output a list image in the touch screen 130 as illustrated in view (a) of FIG. 6. However, the present invention is not limited to the list image. That is, the image may be a web page, a high-resolution picture or the like. When a partial list of the entire list is output because of a size limitation of the screen, the touch screen 130 can output a scroll bar 610 at one side as shown in FIG. 6. At this time, the controller 110 can check the entire scrolling amount and adjust the size of the scroll bar 610. Thereafter, the controller 110 can check whether a drag is generated (S203). If a drag is not generated, the controller 110 can return to step S201. On the other hand, if a drag is generated, the controller 110 can calculate the drag length (S205). To this end, the controller 110 can remember the initial coordinates and generate the drag length using the initial coordinates and current coordinates.

Next, the controller 110 can calculate the scrolling rate according to the calculated drag length and output the calculated scrolling rate (S207). For example, the controller 110 can output the calculated scrolling rate as a percentage rate according to the drag length as illustrated in view (b) of FIG. 6. The controller 110 can calculate the scrolling rate by calculating the ratio of the reference drag length stored in the storage unit 120 to the calculated drag length. View (b) of FIG. 6 illustrates a case where the reference drag length is set as 5 cm. If user drags by 1 cm, the scrolling rate becomes 20%, and if user drags by 4 cm, the scrolling rate becomes 80%. At this time, a user can check the outputted scrolling rate and adjust the scrolling rate by the amount he desires. In more detail, the controller 110 can increase the scrolling rate if the drag length increases as the drag is continued in the same direction, and can decrease the scrolling rate if the drag length between the initial coordinates and the current coordinates decreases as the drag is performed in the opposite direction (180 degrees). Thus, the user can appropriately adjust the scrolling rate so that the image is outputted at a position he desires while checking the scrolling rate outputted at one side of the display unit 131.

In this illustrated example, the drag operation is conducted in a downward direction, as indicated by the presence of the user's finger after the drag as traveled the indicated distance.

Returning to FIG. 5, the controller 110 can check whether a drag is cancelled (S209). If the drag is cancelled, the controller 110 can output the image at the position corresponding to the scrolling rate (S211) as illustrated in views (c) and (d) of FIG. 6. At this time, the controller 110 can scroll to the position corresponding to the scrolling rate, or directly output the image at the position corresponding to the scrolling rate without outputting the scrolled screen. To this end, the controller 110 check the entire scrolling amount of the image, scroll the image as fast as the scrolling rate allows or outputs the image at the position corresponding to the scrolling rate based on the fact that the entire scrolling amount is 100%. However, the present invention is not limited to this condition. That is, the controller 110 can check the scrolling direction, and scroll the image as fast as the scrolling rate indicates or outputs the image at the position corresponding to the scrolling rate based on the fact that the remaining scrolling amount is 100%.

On the other hand, if the drag is not cancelled, the controller 110 can check whether the drag direction is changed (S213). If the drag direction is changed, the controller 110 can determine that the elastic scrolling according to the first exemplary embodiment of the present invention is cancelled, and stop the calculation of the scrolling rate and the drag length (S215). At this time, the case where the drag direction is changed to the opposite direction is exempted. On the other hand, in case the drag direction is not changed, the controller 110 can return to step S203.

Figure 7:
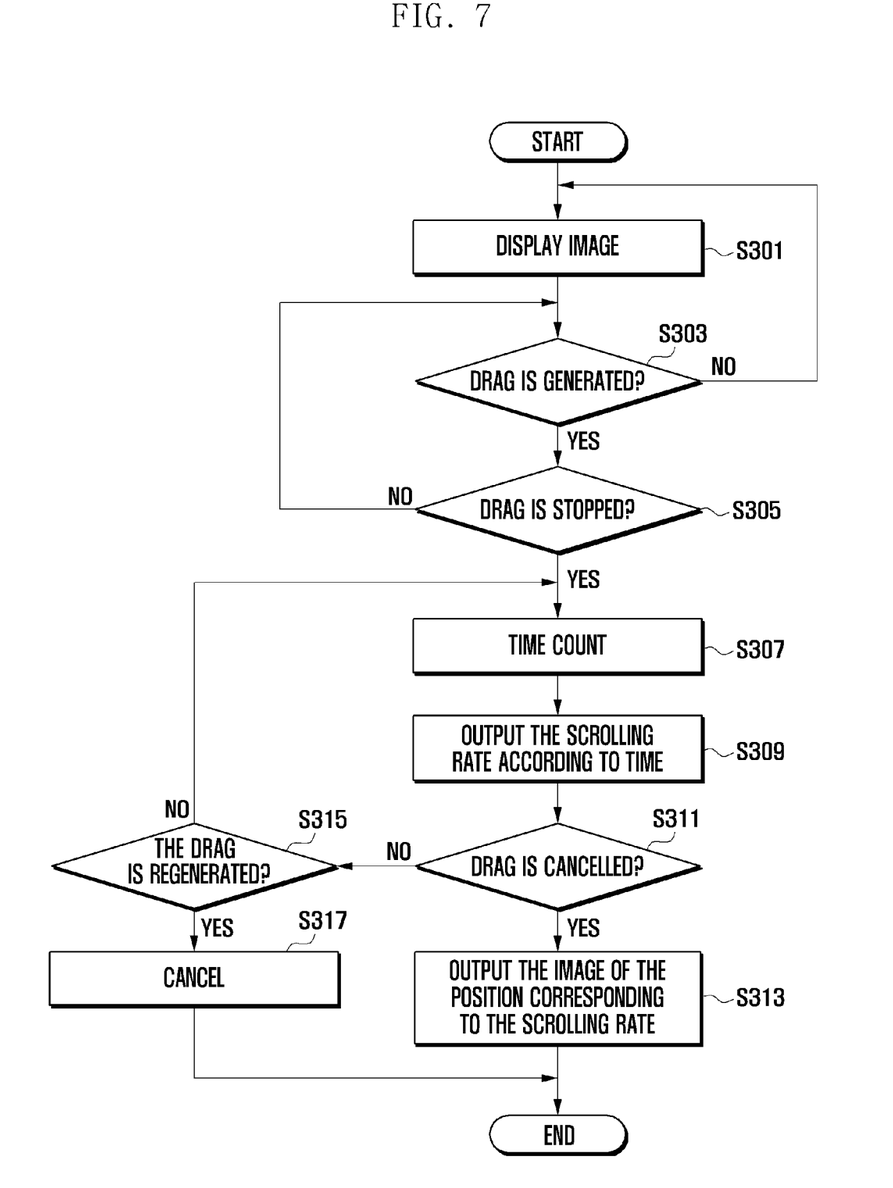
FIG. 7 is a flowchart illustrating a method of scrolling a screen of a portable terminal according to a second exemplary embodiment of the present invention.
Figure 8:
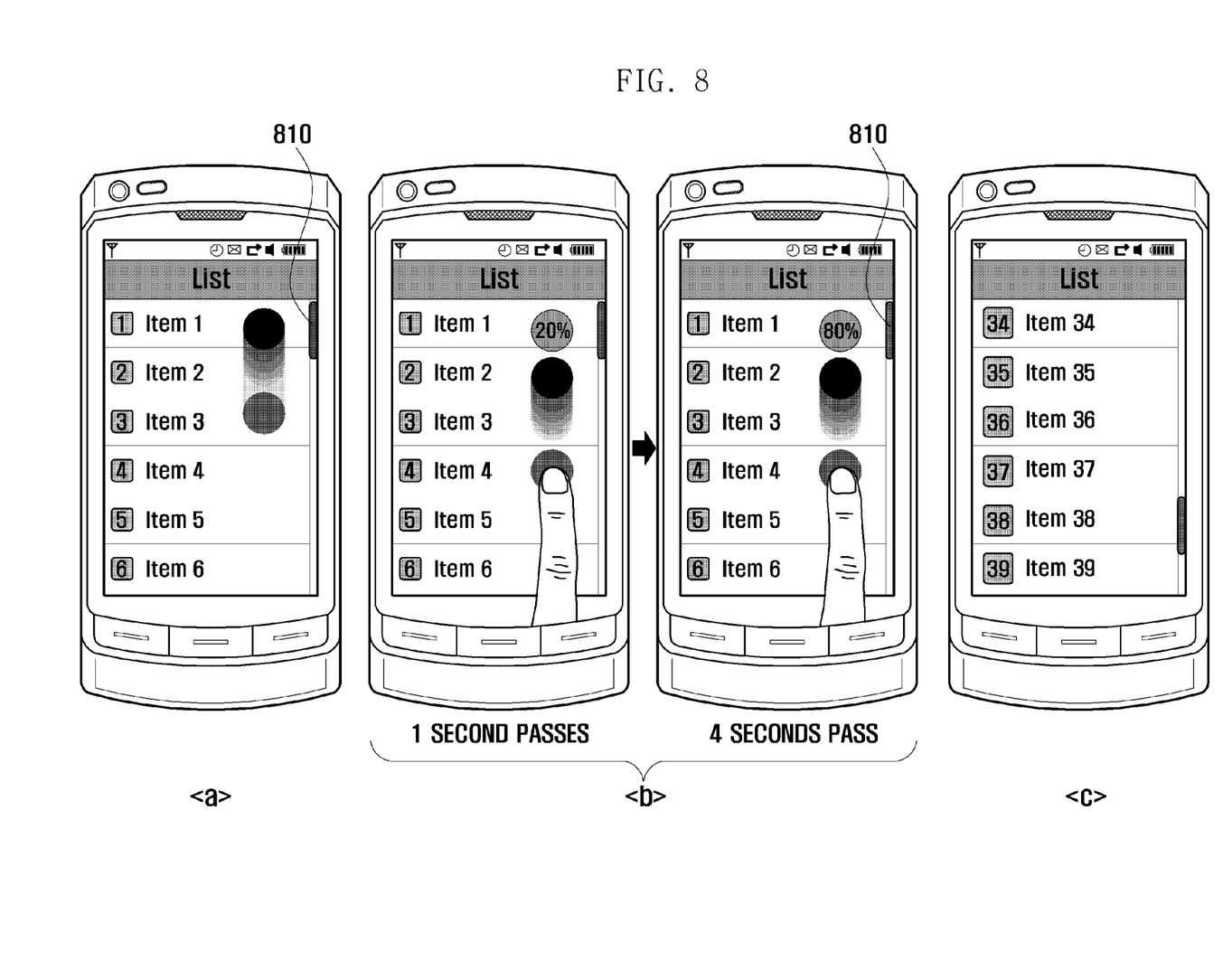
FIG. 8 illustrates representative examples of screen views explaining a second exemplary embodiment of the present invention.

FIG. 7 is a flowchart illustrating a method of scrolling a screen of a portable terminal according to a second exemplary embodiment of the present invention, and FIG. 8 represents exemplary screen views for explaining a second exemplary embodiment of the present invention.

Referring to FIGS. 1, 7 and 8, the controller 110 can display a scrollable image (S301). For example, the controller 110 can output a list image on the touch screen 130 as illustrated in view (a) of FIG. 8. However, the present invention is not limited to the list image. The image may be a web page, a high-resolution picture or the like. Furthermore, if the list image is larger than the size of the touch screen 130, the touch screen 130 outputs a partial list and output a scroll bar 810 at one side of the touch screen. At this time, the controller 110 can adjust the size of the scroll bar 810 by checking the entire scrolling amount. Thereafter, the controller 110 can check whether a drag is generated (S303). If the drag is not generated, the controller 110 can return to step S301. However, if the drag is generated, the controller 110 can check whether the drag is stopped (S305). If the drag is not stopped, the controller 110 can return to step S303. However, if the drag is stopped, the controller 110 can count time from the time point when the drag is stopped (S307), can calculate the scrolling rate according to the counted time (S309), and can output the calculated scrolling rate as illustrated in view (b) of FIG. 8. The controller 110 can calculate the scrolling rate by calculating a ratio of a reference time stored in the storage unit 120 to the counted time as stated above. Here, view (b) of FIG. 8 illustrates a case where the reference time is set as 5 seconds. If one second passes after the drag is stopped, the scrolling rate becomes 20%, and if four seconds pass after the drag is stopped, the scrolling rate becomes 80%. At this time, if the scrolling rate becomes 100%, the controller 110 can change the scrolling rate to 0%, and re-increase the scrolling rate from 0% to 100%. Alternatively, the controller 110 can decrease the scrolling rate from 100% to 0%. Such a process can be repeated until a user cancels the drag.

Next, the controller 110 can check whether the drag is canceled (S311). The drag cancellation can be performed at the moment the scrolling rate becomes the level user desires. If the drag is cancelled, the controller 110 can output an image at the position corresponding to the scrolling rate (S313) as illustrated in view (c) of FIG. 8. At this time, the controller 110 can output a screen that is scrolled up to the position corresponding to the scrolling rate, or to directly output the image of the corresponding position without outputting the scrolled screen. To this end, the controller 110 can check the entire scrolling amount of the image and scroll the image at a rate comparable to the scrolling rate or output the image at the position corresponding to the scrolling rate based on the fact that the entire scrolling amount is 100%. However, the present invention is not limited to this operation. That is, the controller 110 can check the scrolling direction, and to scroll the image as much as the scrolling rate or output the image of the position corresponding to the scrolling rate based on the fact that the remaining scrolling amount in the scrolling direction is 100%.

However, if the drag is not cancelled, the controller 110 can continue to check whether the drag is being regenerated (S315). If the drag is regenerated, the controller 110 can determine that the elastic scrolling operation according to the second exemplary embodiment of the present invention is cancelled, and to stop the scrolling rate calculation and the time count (S317). On the other hand, if the drag is not regenerated, the controller 110 can return to step S307.

The above-described present invention has been described with regard to determined the scrolling rate of an image according the drag-related variation (a drag length or time until drag cancellation after the drag is stopped), and can easily control the scrolling level of the image by outputting the scrolling rate at one side of the display unit 131, thereby improving user's convenience.

Figure 9:
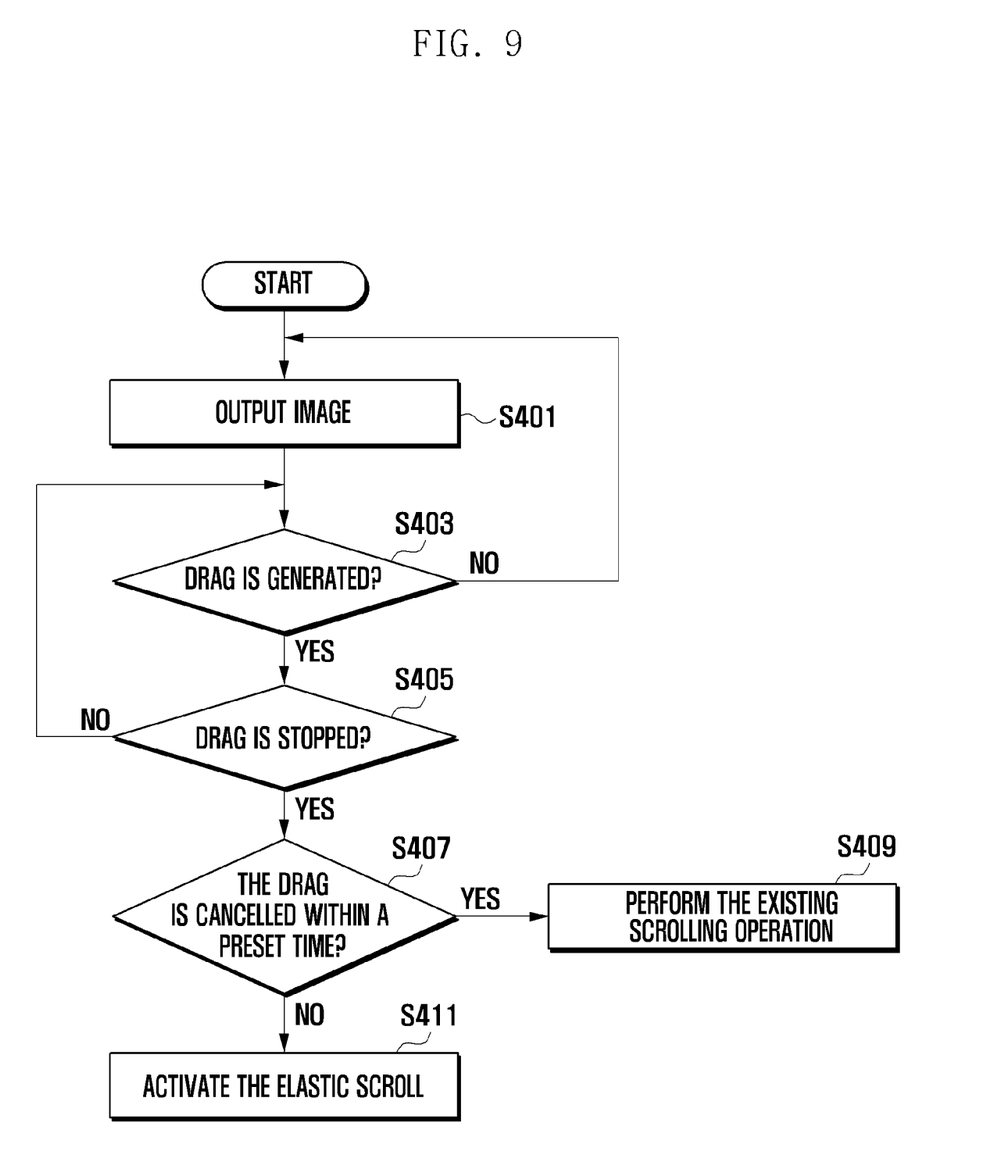
FIG. 9 is a flowchart illustrating a method of distinguishing an elastic scrolling method from the existing scrolling method in case the two methods are used together.

FIG. 9 is a flowchart illustrating a method of distinguishing an elastic scrolling method from the existing scrolling method in case the two methods are used together.

Referring to FIGS. 1 and 9, the controller 110 can output a scrollable image (e.g., a phonebook list, a music file list and a web page or the like) (S401) on the touch screen 130. The image may represent a partial image of the entire image because of a size limitation of the touch screen 130. Thus, a, a scroll bar is also presented on one side of the touch screen. Thereafter, the controller 110 can check whether a drag is generated (S403). If the drag is not generated, the controller 110 can return to step S401. On the other hand, if a drag is generated, the controller 110 can check whether the drag is stopped (S405). If the drag is not stopped, the controller 110 can return to step S403. However, if the drag is stopped, the controller 110 can check whether the drag is cancelled within a preset time after the drag is stopped (S407). If the drag is cancelled within a preset time, the controller 110 can perform the existing scrolling operation (S409). That is, the controller 110 can scroll the image by as much as a preset rate and output the image. On the other hand, if the drag is not cancelled within a preset time, the controller 110 can activate the elastic scroll described with reference to FIGS. 5 and 7 (S411). That is, if the drag is not cancelled within a preset time, the controller 110 can calculate the drag length, and calculate the scrolling rate according to the drag length when the drag is cancelled. Thereafter, if the drag is cancelled, the controller 110 can output the image at the position corresponding to the calculated scrolling rate. Alternatively, the controller 110 can count time after a preset time, and calculate the scrolling rate according to the counted time. Thereafter, if the drag is cancelled, the controller 110 can control to output the image of the position corresponding to the scrolling rate.

Figure 10:
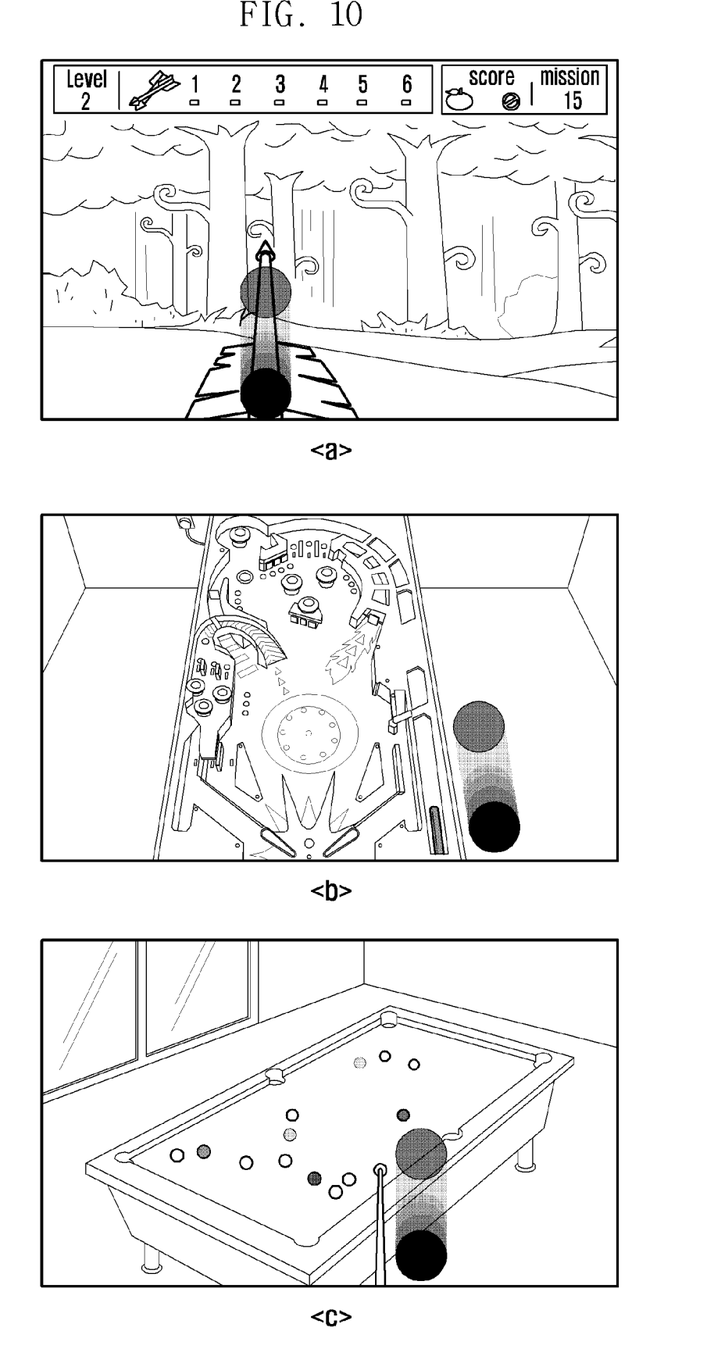
FIG. 10 illustrates an example that an elastic scrolling is applied to a game according to an exemplary embodiment of the present invention.

Further, until now, the case of using the elastic scroll according to the present invention in scrolling the screen of a portable terminal was used as an example, but the present invention is not limited to the described operation. That is, the elastic scroll according to the present invention can be used in a game that uses direction and intensity. For example, in a billiard or arrow-shooting game of FIG. 10, the drag direction is mapped to the direction of the cue or the arrow, and the drag length is mapped to the intensity of the force so that the game is easily played.

In addition, the touch screen was used above as an example, but the present invention is not limited to the described operation. That is, the elastic scrolling method according to the present invention can also be applied to a portable terminal consisting of a display unit and a touch pad.

The above-described methods and controller according to the present invention can be realized in hardware or as software or computer code that can be stored in a recording medium such as a CD ROM, an RAM, a floppy disk, a hard disk, or a magneto-optical disk or downloaded over a network (i.e., The computer program can be provided from an external source which is electronically downloaded over a network, e.g., Internet, POTS, so that the methods described herein can be rendered in such software operable in the controller, a general purpose computer, or a special processor or in programmable or dedicated hardware, such as an ASIC or FPGA. As would be understood in the art, the computer, the processor or the programmable hardware include memory components, e.g., RAM, ROM, Flash, etc. that may store or receive software or computer code that when accessed and executed by the computer, processor or hardware implement the processing methods described herein. The code when loaded into a general purpose computer transformed the general purpose computer into a special purpose computer that may in part be dedicated to the processing shown herein. In addition, the computer, processor or dedicated hardware may be composed of at least one of a single processor, a multi-processor, and a multi-core processor.

Although exemplary embodiments of the present invention have been described in detail hereinabove, it should be clearly understood that many variations and modifications of the basic inventive concepts herein taught which may appear to those skilled in the present art will still fall within the spirit and scope of the present invention, as defined in the appended claims.

What is claimed is:

1. A method for scrolling a screen of a portable terminal having a touch screen, the method comprising:
    displaying a current portion of a scrollable image;
    checking a scrolling amount of the image;
    measuring a drag-related variation when a drag is detected, wherein the displaying of the current portion of the scrollable image is maintained until the drag is cancelled;
    determining a scrolling value based on the drag-related variation and a preset reference value; and
    displaying the image at a position corresponding to the scrolling value based on the scrolling amount when the drag is cancelled;
    wherein the drag related variation is at least one of: i) drag length; and ii) elapsed time until drag cancellation after the drag is stopped.

2. The method of claim 1, wherein:
    the preset reference value is a preset reference drag length;
    the scrolling value is determined as a percentage of a maximum scrolling value; and
    the percentage equals a ratio of a current drag length to the preset reference drag length.

3. The method of claim 1, further comprising one of:
canceling the scrolling value determination when a drag direction is changed while the scrolling value is calculated according to the drag length; and
canceling the scrolling value determination when a drag is regenerated while the scrolling value is calculated according to a time until drag cancellation after the drag.

4. The method of claim 1, further comprising:
displaying the determined scrolling value.

5. The method of claim 4, wherein displaying the scrolling value comprises at least one of:
displaying the scrolling value at one side of a display unit as a percentage;
displaying a graph illustrating the scrolling value;
checking a list of a position corresponding to the scrolling value, and displaying a first character of the list;
displaying a preset specific color according to the scrolling value; and
displaying a scroll bar indication area, displaying a scroll bar to a current position, and displaying a virtual scroll bar to a position corresponding to the scrolling value.

6. The method of claim 4, further comprising one of:
increasing the scrolling value according to an increase of the drag length, and decreasing the scrolling value according to a decrease of the drag length; and
increasing the scrolling value according to an increase in time after the drag is stopped, and if the scrolling value becomes 100%, decreasing the scrolling value from 100% to 0% or increasing the scrolling value from 0% to 100% after initializing the scrolling value.

7. The method of claim 1, further comprising:
checking whether the drag is cancelled within a preset specific time after the drag is generated,
wherein a process of measuring the drag-related variation and a following process are performed in the event the drag is not cancelled within the specific time.

8. The method of claim 1, wherein the scrolling value is a scrolling rate.

9. A method for scrolling a screen of a portable terminal having a touch screen, the method comprising:
displaying a scrollable image;
checking a scrolling amount of the image;
measuring a drag-related variation when a drag operation is generated;
determining a scrolling value based on the drag-related variation and a preset reference time; and
displaying the image at a position corresponding to the scrolling value based on the scrolling amount when the drag is cancelled;
wherein the drag related variation is elapsed time until drag cancellation after the drag is stopped, the scrolling value is determined as a percentage of a maximum scrolling value corresponding to the preset reference time, the percentage equaling a ratio of a counted time after the drag is stopped to the preset reference time.

10. The method of claim 3, wherein the scrolling value is a scrolling rate.

11. An apparatus for scrolling a screen of a portable terminal, the apparatus comprising:
a touch screen which displays a current portion of a scrollable image and recognizes operations of a touch, a drag and a drag cancellation; and
a controller, including a processor, for:
checking a scrolling amount of the image when the image is displayed;
measuring drag-related variation when a drag detected, wherein the displaying of the current portion of the scrollable image is maintained until the drag is cancelled;
calculating a scrolling value based on the drag-related variation and a preset reference value; and
displaying an image at a position corresponding to the scrolling value based on the scrolling amount of the image when the drag is cancelled;
wherein the drag related variation is determined according to at least one of: i) drag length; and ii) elapsed time until drag cancellation after the drag is stopped.

12. The apparatus of claim 11, wherein:
the preset reference value is a preset reference drag length;
the scrolling value is calculated as a percentage of a maximum scrolling value; and
the percentage equals a ratio of a current drag length to the preset reference drag length.

13. The apparatus of claim 12, wherein the controller cancels the scrolling value calculation according to the drag length when the drag direction is changed.

14. The apparatus of claim 11, wherein the controller cancels the scrolling value calculation according to a time until the drag cancellation after the drag when a drag is regenerated.

15. The apparatus of claim 11, wherein the calculated scrolling value is displayed on the touch screen.

16. The apparatus of claim 15, wherein the scrolling value is displayed using at least one of a percentage, a graph, a first character, a color according to the scrolling value, and a position of a virtual scroll bar.

17. The apparatus of claim 15, wherein the controller performs one of: increasing the scrolling value when the drag length increases and decreasing the scrolling value when the drag length decreases, and increasing the scrolling value according to an increase of time after the drag is stopped and if the scrolling value becomes 100%, decreasing the scrolling value from 100% to 0% or increasing the scrolling value from 0% to 100% after initializing the scroll value.

18. The apparatus of claim 15, further comprising:
a sensor configured to recognize a horizontal mode or a vertical mode of the portable terminal,
wherein the controller changes a display position of the displayed scrolling value according to the horizontal mode or the vertical mode of the portable terminal.

19. The apparatus of claim 11, wherein the controller checks whether a drag cancellation is generated within a preset time after the drag is generated, calculates the scrolling value by measuring the drag-related variation if the drag cancellation is not generated within a preset time, and outputs an image at a position corresponding to the scrolling value.

20. A method for scrolling a screen of a portable terminal having a touch screen, the method comprising:
displaying a scrollable image;
checking a scrolling amount of the image;
measuring a drag-related variation when a drag operation is generated;
determining a scrolling value based on the drag-related variation and a preset reference value;
displaying information of the determined scrolling value; and
displaying the image at a position corresponding to the scrolling value based on the entire scrolling amount when the drag operation is cancelled.

21. The method of claim 20, wherein the displayed information is at least one of a percentage of a maximum scrolling value, a graph, a first character, a color according to the scrolling value, and a position of a virtual scroll bar.

22. The method of claim 21, wherein the displayed information is the percentage.

23. The method of claim 20, wherein the scrolling value is a scrolling rate.

\* \* \* \* \*